Oct. 13, 1925.
A. JOHNSTON
LAWN MOWER
Filed March 24, 1919
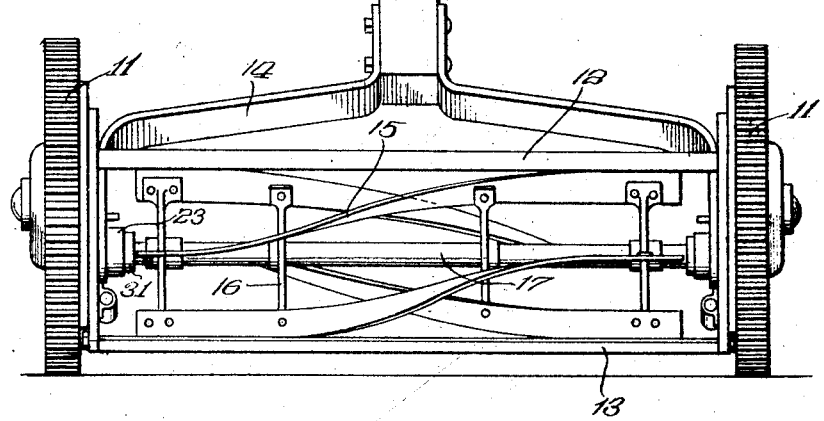
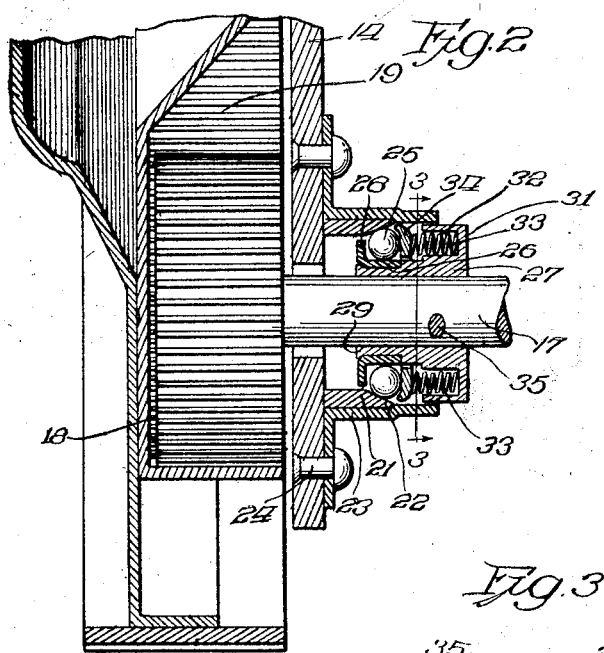
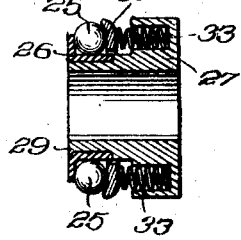
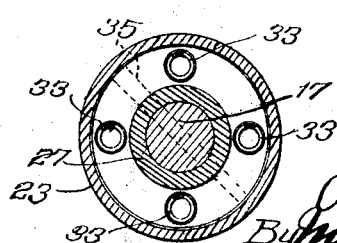

Patented Oct. 13, 1925.

1,556,997

UNITED STATES PATENT OFFICE.

ALLEN JOHNSTON, OF OTTUMWA, IOWA, ASSIGNOR TO JOHNSTON PRESSED GEAR COMPANY, OF OTTUMWA, IOWA, A CORPORATION OF IOWA.

LAWN MOWER.

Application filed March 24, 1919. Serial No. 284,636.

*To all whom it may concern:*

Be it known that I, ALLEN JOHNSTON, a citizen of the United States, residing in Ottumwa, in the county of Wapello and State of Iowa, have invented a new and useful Improvement in Lawn Mowers, of which the following is a specification.

This invention relates in general to lawn mower construction, and has more particular reference to the provision of new and improved means for holding the reel shaft of the lawn mower in accurate relation with the main frame so that the blades of the reel may always make the accurate desired contact throughout their length with the bed knife against which the grass being cut is sheared.

Lawn mowers are used by persons unskilled in adjusting machinery and are subject to considerable abuse, and my invention contemplates the provision of means insuring against wear of the parts destroying the parallelism of the reel shaft and bed knife after this has once been properly set.

Another very important object of the invention is the provision of a lawn mower wherein the center of rotation of the reel will be accurately maintained, and this without imposing any unequal strain on the parts.

Another object of the invention is the provision of a ball or other anti-friction construction wherein the balls or other devices may be assembled upon the reel shaft before it is fastened in the frame.

Numerous other objects and advantages of the invention will be apparent as it is better understood from the following description when considered in connection with the accompanying drawing illustrating a preferred embodiment thereof.

Referring to the drawing,

Figure 1 is a front view of the lawn mower embodying my present invention;

Fig. 2 is an enlarged perspective view through one of the bearings of the reel shaft in the main frame;

Fig. 3 is a section taken substantially on the line 3—3 of Fig. 2; and

Fig. 4 is a sectional view through the portion of the bearing carried by the reel shaft in the present embodiment.

For the purpose of illustrating my invention, I have shown on the drawing a lawn mower having the usual driving wheels 11 and main frame composed of cross connecting members 12, bed knife and support 13, and side plates 14. The usual blades 15 are carried by a plurality of spiders 16, which spiders are secured upon a reel shaft 17, all of which parts may have any usual or preferred construction.

The reel shaft has bearings in the side plates of the main frame and of course carries at its ends ratchet pinions 18 for engaging internal gears 19 carried by the driving wheels 11. The two bearings of the reel shaft are or may be duplicates of each other and a description of one of them will suffice in the present instance for both. A member 21 having a conical bearing face 22 is held in position against the side plates by a holding sleeve 23 riveted at 24 to the main frame. This conical face is engaged by balls 25 or other anti-friction devices having a main bearing against a bearing collar 26 carried by a bearing housing or cage holder 27 fast upon the reel shaft 17. The member 26 consists of a cylindrical part against which the anti-friction devices bear, and which is indicated by reference character 26 on the drawings and also an upturned flange 28 at its outer end. This member is positioned over an end of the carrier member 27 and this member is then preferably riveted up as indicated at 29 to hold the parts together. The member 27 has at its other end a part 31 of enlarged diameter and in this part are provided a plurality of recesses 32 in which are seated springs 33 which bear against an annulus or ring 34 having an overturned outer edge adapted to co-operate with the upturned part or flange 28 of the member 26 to hold the balls in place during assembling as may be seen in Fig. 4. The structure is assembled by first assembling the part shown in Fig. 4 and then positioning these upon the reel shaft after it is put through the spiders of the reel. Thereafter the structure shown in Fig. 4 is pushed up until the balls or other anti-friction devices engage the conical face of the member 21 carried by the main frame where it is locked in place by securing to the shaft as with a pin 35.

The relation of the structure at the time of assembly is preferably such that the balls are pushed back by the conical surface 22 a substantial distance away from the upturned part 23 of the part 26, and when the structure is assembled the parts 21, 26 and 34 constitute companion members of the ball race. The part 34 under the pressure of the springs maintains the desired relation between the reel and the bed knife, for as wear occurs movement of the movable part of the bearing will maintain the balls in accurate contact with the conical face of the member 21 and thus maintain the bed knife in exactly the desired relation with the main frame of the mower.

In providing a number of springs acting upon the annulus 34, the pressure is equalized and no twisting force is exerted so that no additional wear is provided by reason of the use of this construction, the parts having normal bearing and bearing under like pressure all the way around the shaft.

It is thought that the invention and many of its attendant advantages will be better understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a lawn mower, the combination of a main frame, a reel shaft, and bearings for said shaft, said bearings comprising a sleeve secured to the main frame, a bevel ring disposed within said sleeve and forming an outer race ring, and a unitary bearing assembly on the shaft, comprising a sleeve secured to the shaft and having an outer upset flange, anti-friction balls disposed within said flange, and a series of spiral springs forcing said balls into contact with the bevel face of said ring.

2. In a lawn mower, the combination of a main frame, a reel shaft, and bearings for said shaft, said bearings comprising a sleeve secured to the main frame, a bevel ring disposed within said sleeve and forming an outer race ring, and a unitary bearing assembly on the shaft, comprising a sleeve secured to the shaft, anti-friction balls disposed about said sleeve, said sleeve having an outer upset flange forming a stop for said balls, a movable member on the sleeve inwardly of said balls, said sleeve being recessed at its inner end and having a series of spiral springs housed in the recesses thereof and bearing against said movable member to force the balls into contact with the bevel face of said ring.

3. In a lawn mower, the combination of a main frame, a reel shaft, and bearings for said shaft, said bearings comprising a sleeve secured to the main frame, a bevel ring disposed within said sleeve and forming an outer race ring, and a unitary bearing assembly on said shaft comprising a sleeve secured to the shaft, means forming an inner race-way on said sleeve, anti-friction members in said race-way, and springs housed in said sleeve and forcing said anti-friction members into contact with the bevel face of said ring.

4. A lawn mower, comprising a main frame and a reel shaft having bearings therein, said bearings comprising a conical member on said frame and two companion members, one of which is movable and the other fixed, whereby to maintain the adjustment between said members, and anti-friction devices engageable by said companion members prior to assembly of said shaft on a frame and engageable after such assembly by said movable member and said conical bearing member.

5. A lawn mower, comprising a main frame, and a reel shaft, having bearings therein, said bearings comprising a conical bearing member on the frame, and a bearing assembly secured to the shaft, said assembly including a flanged sleeve forming an inner race-way, anti-friction members disposed in said race-way, and a spring-pressed movable member adapted to hold said anti-friction members in contact with the flange of the sleeve prior to assembly and in contact with said conical bearing member when the shaft is positioned in the frame.

6. A lawn mower, comprising a main frame and a reel shaft having bearings therein, said bearings comprising a cage of balls carried by the shaft and adapted to be held thereon prior to positioning the shaft in the frame and a companion member carried by the main frame and engaged by the balls in said cage, the bearing on the main frame having a conical surface upon which the balls are adapted to move and said cage being extensible to maintain said balls permanently in accurate contact with said conical face.

7. A shaft for the reels of lawn mowers and the like and provided with a ball bearing cage, having upturned sides, one of which is yieldingly held and movable to permit insertion of the balls, between said sides.

8. A shaft for the reels of lawn mowers and the like, comprising a shaft and collar thereon, a hardened upturned member fast to said collar, behind the upturn of which anti-friction devices may be seated, and a movable member for holding said anti-friction devices in contact with said upturned part prior to the assembly of said shaft in the lawn mower frame.

9. A lawn mower comprising a main frame and a reel shaft having bearings therein, said bearings comprising a ring secured to the frame and providing a conical bearing surface, and a bearing assembly secured to the reel shaft, comprising a sleeve secured to said shaft, means providing a temporary ball retaining race-way on said sleeve, anti-friction balls disposed in said race-way, and means on said sleeve for forcing said balls into yieldable contact with the conical surface of said ring after assembly.

10. A shaft for the reels of lawn mowers and the like, comprising a shaft and unitary bearing members secured thereto, said bearing members each comprising a double flanged sleeve, a ball engaging and retaining annulus slidably mounted thereon and between said flanges, anti-friction balls positioned on said sleeve between one of the flanges thereof and the annulus, yieldable means engaging the opposite flange of the sleeve adapted to force the annulus into engagement with the balls, for retaining the balls prior to assembly of said shaft in a lawn mower frame.

ALLEN JOHNSTON.